July 11, 1967  J. A. GAYLORD  3,330,014
RELEASABLE STRAP CONNECTOR
Filed Feb. 18, 1966  2 Sheets-Sheet 1

INVENTOR.
John A. Gaylord
BY George B. White
Attorney

July 11, 1967
J. A. GAYLORD
3,330,014
RELEASABLE STRAP CONNECTOR
Filed Feb. 18, 1966
2 Sheets-Sheet 2
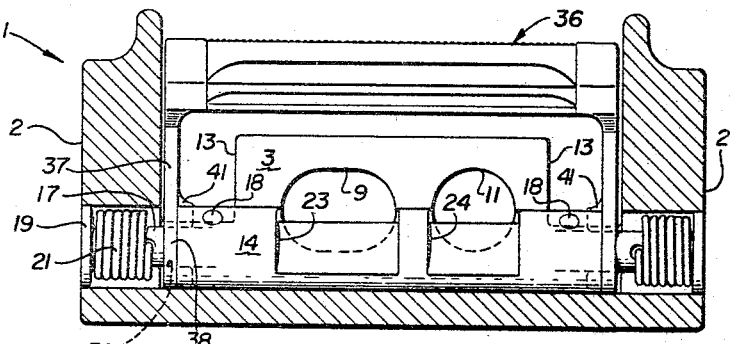
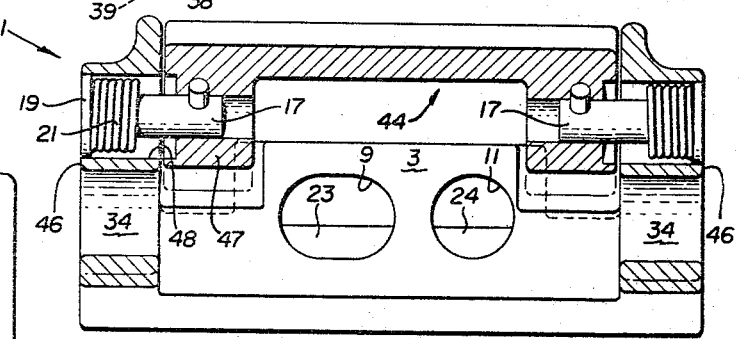
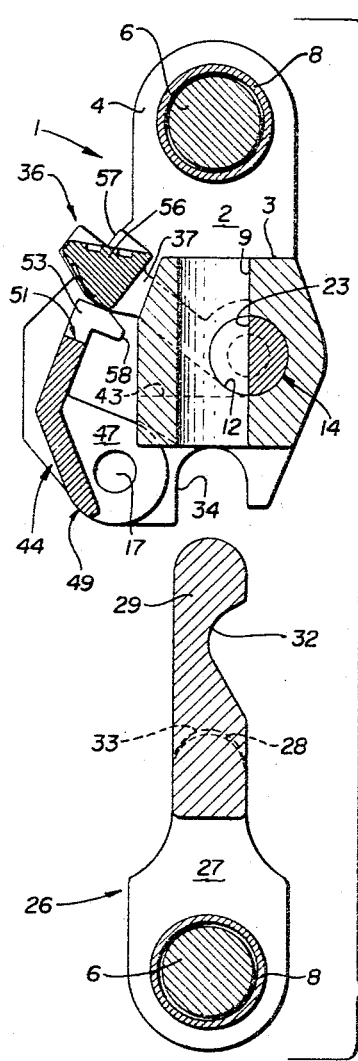
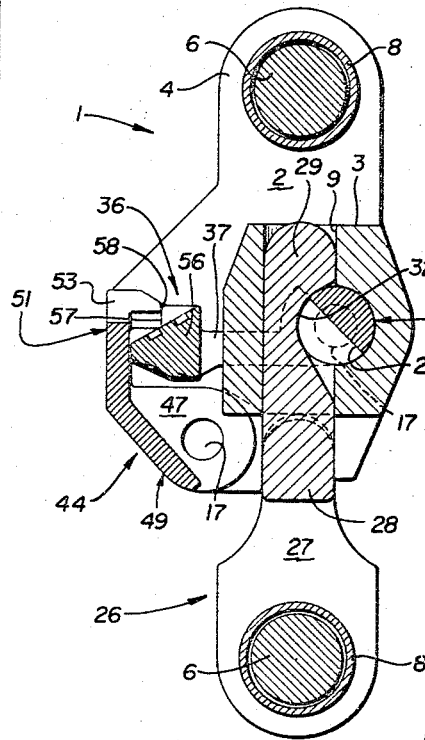
INVENTOR.
John A. Gaylord
BY George B. White
Attorney

Patent 3,330,014 — Releasable Strap Connector

3,330,014
RELEASABLE STRAP CONNECTOR
John A. Gaylord, San Rafael, Calif., assignor to H. Koch & Sons, Corte Madera, Calif., a corporation of California
Filed Feb. 18, 1966, Ser. No. 528,605
5 Claims. (Cl. 24—230)

This invention relates to a releasable strap connector.

The primary object of this invention is to provide a female member and a male member, each adapted to be connected to a strap and prongs on the male member can be locked into the female member by a rocking bar, which bar in turn is controlled by a yoke lever normally urged into a locking position, and finally locked by a locking lever which holds the yoke lever in locking position; means being provided to assure the insertion of the male member always in a predetermined position relatively to the female member; thereby to assure connection of straps, such as those on a canopy or parachute, and positively prevent accidental release, yet accomplishing quick release in emergencies.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the acompanying drawings for the illustrative embodiment of the invention, wherein:

FIG. 4 is a sectional view of the female member, the section being taken on lines 4—4 of FIG. 2.

FIG. 5 is a sectional view of the female member, the section being taken on lines 5—5 of FIG. 3.

FIG. 6 is a cross-sectional view of the male and female members in interlocked position.

FIG. 7 is a cross-sectional view of the male and female members in disengaged position.

Figures 1, 2, 3:
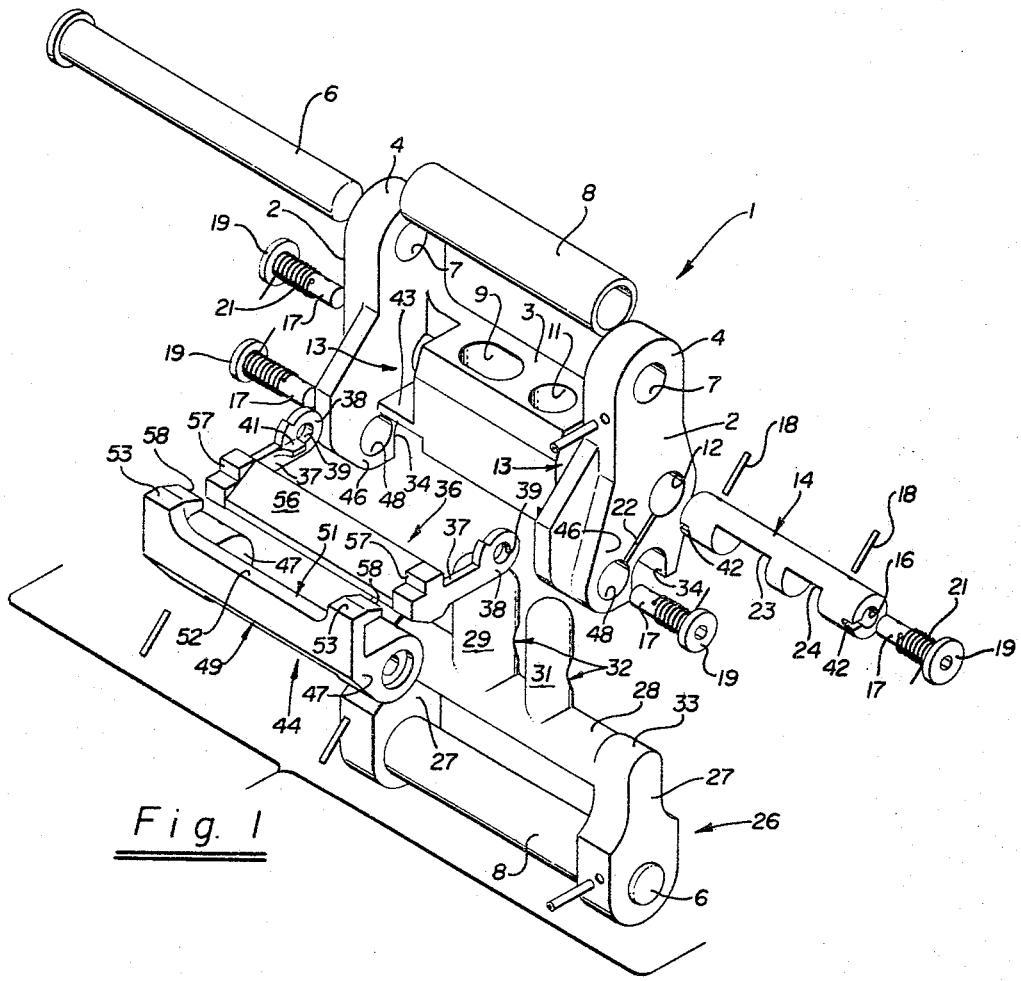
FIG. 1 is a perspective development view showing the parts of the female member and the male member.
FIG. 2 is a side view of the female member.
FIG. 3 is a front view of the female member.

The female member 1 of the connector includes a pair of parallel flanges 2 which are connected by a transverse body 3. The cross-sectional area of the body 3 is smaller than the area of each flange 2 so that each flange 2 has a lug 4 extended beyond the body 3, as shown in FIG. 1 to accommodate a suitable strap holder device. For simplicity's sake in the herein illustration, a strap holder element in the form of a pin 6 is fixed in holes 7 in the lugs 4 of the flange 2, spaced from the adjacent side of the body 3. In this illustration a roller sleeve 8 is provided on the pin 6 between the lugs 4 to facilitate adjustment of the length of the strap or webbing thereon, but other types of strap holder elements such as the type shown in U.S. Patent No. 2,938,254 for Webbing Adapter issued to J. A. Gaylord on May 31, 1960, may be utilized.

The body 3 has a pair of socket holes 9 and 11 therethrough. These holes 9 and 11 are parallel with the flanges 2. The hole 9 is larger than hole 11 for the purpose hereinafter described. A bearing hole 12 is formed through the body transversely between the flanges 2 and extends also through the flanges 12 from end to end. This bearing hole 12 partially intersects the socket holes 9 and 11, as shown in FIG. 6. In this illustration the bearing hole 12 is of circular cross-section and one-half of the hole 12 is located within and across the socket holes 9 and 11. On each end of the body 11 is a socket slit 13 to accommodate certain operating parts between each flange 2 and the adjacent end of the body 3, as hereinafter described. These socket slits 13 are formed around the adjacent portions of the bearing hole 12.

In the bearing hole 12 is a locking bar 14. This locking bar 14 is located within the body 3 with its ends at the respective socket slits 13. Into an axial hole 16 in each end of the locking bar 14 is secured a journal pin 17, for instance by a cross pin 18. The head 19 of each journal pin 17 is rotatable within the hole 12 in the adjacent flange 2.

In the portion of each journal pin 17 within the adjacent flange 12 is a coil spring 21, one end of which is anchored in the journal pin 17, the other end of which spring 21 is anchored in a slot 22 in the outside face of the adjacent flange 2. The locking bar 14 has a pair of cut away portions 23 and 24 respectively in registry with the socket holes 9 and 11 and corresponding in size to the respective proportions of said socket holes 9 and 11. The cut away portions are cut on the same diametrical plane of the locking bar 14 so that when the locking bar 14 is turned into releasing position, as shown in FIG. 7, the cut away portions 23 and 24 complement the socket holes 9 and 11 respectively, thereby leaving said socket holes 9 and 11 unobstructed for the insertion and removal of suitable male members hereinafter described.

The male member 26 is also adapted to be connected to the strap or webbing in any suitable manner. For simplicity the male member 26 is generally U-shaped in the legs 27 of which is secured a pin 6 the same way as the previously described strap connection and is covered by the roller sleeve 8. On the cross bar 28 of the male member 26 are provided a pair of prongs 29 and 31 which are of different shape and size so as to fit the corresponding socket holes 9 and 11 in the body 3. Each prong 29 and 31 is provided with a recess 32 which recesses 32 face the respective cut away portions 23 and 24 of the locking bar 14 when inserted in the socket holes 9 and 11. The cross bar 28 of the male member has a projecting shoulder 33 at each end, which fits into a pocket 34 in the adjacent end of one of the flanges 2 as shown in FIG. 6. The spacing between the recesses 32 and the line or level of the shoulders 33 corresponds to the distance between the level of the pockets 34 and the position of the cut away portions 23 and 24, so that when the prongs 29 and 31 are inserted in the pockets 34 then the recesses 32 are properly in registry with the cut away portions 23 and 24 of the locking bar 14. Thus when the locking bar 14 is turned into the position shown in FIG. 6, it projects into the recesses 32 and locks the prongs 29 and 31 into the socket holes 9 and 11. The coil springs 21 are wound so as to normally urge the locking bar 14 to turn in a counter-clockwise direction viewing FIGS. 1, 6 and 7, namely to turn the locking bar 14 from the position shown in FIG. 7 into the locking position shown in FIG. 6.

A yoke lever 36 is provided for the manipulation of the locking bar 14. The legs 37 of the yoke lever 36 have an enlarged journal head 38 thereon provided with a hole 39 which fits over a portion of the pin 17 in the adjacent slit 13. Each head 38 has clutch projections 41 which interlock with cross slots 42 in the adjacent end of the locking bar 14 so that when the yoke lever 36 is turned it rocks or rotates the locking bar 14.

The clutch projections 41 and slots 42 are at such angle relatively to the cut away portions 23 and 24 that the said locking bar 14 is in locking position, as shown in FIG. 6, when the yoke lever 36 is generally at right angles to the body 3. The action of the coil springs 21, therefore, urges the yoke lever 36 into locking position, in which position the legs 37 of the yoke lever 36 abut the respective bottoms 43 of the socket slits 13. Thus the yoke lever 36 is urged normally away from the strap holder sleeve 8 in the lugs 4 of the female member 1 and towards the male member when the latter is inserted in connecting position.

A locking lever 44 is journalled in projecting side portions 46 of the flanges 2 by journal pins of the same type as used in the ends of the locking bar 14. The locking lever 44 has spaced hubs 47 with holes therein into which are secured the journal pins 17 in the manner heretofore described in connection with the journalling of the locking bar 14. For this purpose there are suitable holes 48 provided in the respective projecting portions 46 of the flanges 2. These holes 48 are spaced from the ends of the bearing hole 12 toward the portion of the flanges 2 between which the male member 26 is inserted. In this illustration the holes 48 are alongside the pockets 34 for the shoulders 33 of the male member 26. The locking lever body 49 extends between the hubs 47 and is suitably recessed and terminates in a handle flange 51. The edge of the handle flange 51 is recessed longitudinally to form an engagement space 52 between ears 53. The handle 51 is at an angle to the body 49 of the locking lever 44 so that in the locked position the locking lever 44 embraces the outer end or manipulating bar 56 of the yoke lever 36. This manipulating bar 56 is shaped so that each end thereof forms an engagement shoulder 57 as shown in FIGS. 6 and 7. The ears 53 of the handle flange 51 of the locking lever 44 are formed with lips 58 fitting into the engagement shoulders 57.

The springs 21 of the journal pins 17 in the locking lever hubs 47 are so anchored that they normally urge the locking lever in a clockwise direction viewing FIGS. 1, 6 and 7, namely rotate the locking lever 44 away from the male member 26 and oppositely to the rocking of the yoke lever 36. The outer corners of the ears 53 are so shaped that when the yoke lever 36 is raised into unlocking position, as shown in FIG. 7, the ears 53 of the locking lever 44 engage the ends of the manipulating bar 56 and hold the manipulating bar 56 in unlocking position, thereby to permit the insertion and release of the prongs 29 and 31 of the male member 26.

In operation straps or webbings are suitably secured to the respective strap connectors, in this instance over the roller sleeves 8 of the pins 6, respectively of the female member 1 and male member 26. Then the operator places his thumb in the engagement recess 52 of the handle flange 51, while the flanges 2 are held, or hang on a strap, and pulls the locking lever 44 away from the body 3. While the locking lever 44 is thus disengaged fror the yoke lever 36, the operator pulls the manipulating bar 56 of the yoke lever 36 so as to pull it away from the locking lever and against the action of the coil springs 21 thereby to turn the locking bar 14 into unlocking position as shown in FIG. 7. In this position the manipulating bar 56 abuts against the adjacent corner of the body 3. Then the locking bar 44 is released and it is snapped under the manipulating bar 56 into the position shown in FIG. 7 holding the female member in readiness for engagement, with the locking bar 14 turned out of the way as shown in FIG. 7. Then the prongs 29 and 31 are inserted ito the socket holes 9 and 11. These prongs can be inserted only the proper way to align the recess 32 with the cut away portions 23 and 24 of the locking bar 14. When the shoulders 33 of the male member 26 are nested in the pockets 34 in the flanges 2, the locking lever 44 is pulled out from under the yoke lever 36 and the latter is snapped toward the male member into the locking position shown in FIG. 6. The locking lever 44 automatically snaps over the yoke lever 36 to positively hold the connecting members 1 and 2 in interlocking position.

I claim:
1. In a releasable strap connector,
(a) a female member including
(b) a pair of spaced flanges,
(c) a body between and connecting the flanges,
(d) strap holder means between said flanges spaced from said body,
(e) said body having socket holes therethrough generally parallel with said flanges,
(f) said flanges and said body having a bearing hole therethrough partially intersecting said socket holes,
(g) a locking bar oscillatable in the bearing hole within said body, portions of said locking bar projecting into said socket holes being cut away to leave said socket holes unobstructed in one position of the locking bar and to project into said socket holes in another position of said locking bar,
(h) a male member,
(i) prongs on the male member fitting into said socket holes, said prongs having recesses therein in registry with the cut away portions of said locking bar in said body, whereby said locking bar engages said recesses when turned into locking position,
(j) a yoke lever having its legs connected to said locking bar for locking said bar,
(k) resilient means to urge said locking bar and said yoke lever to turn away from said strap holder means thereby to turn said locking bar into locking position,
(l) a locking lever journalled on said flanges,
(m) resilient means to urge said locking lever oppositely to said yoke lever and towards said strap holder element,
(n) means on said locking lever to engage said yoke lever and to lock said yoke lever in locking position.
2. The invention defined in claim 1, and
(o) a manipulating bar on said yoke lever,
(p) a locking flange on said locking lever,
(q) interlocking projections on said manipulating bar and on said locking flange to interlock in the respective abutting positions of said manipulating bar and locking lever.
3. The invention defined in claim 1, and
(o) said body having a socket slit at each end thereof at said flange, in registry with said bearing hole,
(p) the ends of the legs of said yoke lever being extended in said slits and forming the connection between said yoke lever and said locking bar,
(q) journal means in the ends of said locking bar journalled in the respective flanges.
4. The invention defined in claim 3, and
(r) said resilient means for said yoke lever being a coil spring around each journal means in each flange anchored at one end in said journal means and at the other end in said flange.
5. In a releasable strap connector,
(a) a female member, including
(b) a pair of spaced flanges,
(c) a body between and connecting the flanges and having smaller cross sectional area than the area of said flanges,
(d) a strap holder element between said flanges spaced from one side of said body,
(e) said body having socket holes therethrough parallel with said flanges,
(f) said flanges and said body having a bearing hole therethrough partially intersecting said socket holes,
(g) said body having a socket slit adjacent each flange around said socket hole,
(h) a locking bar oscillatable in the bearing hole within said body, portions of said locking bar projecting into said socket holes being cut away to leave said socket holes unobstructed in one position and to project into said socket holes in another position,
(i) a male member,

(j) prongs on the male member fitting into said socket holes, said prongs having recesses therein in registry with the cut away portions of said locking bar in said body, whereby said locking bar engages said recesses when turned into locking position, (k) first journal means connected to each end of said locking bar to journal said locking bar in the respective flange, (l) a yoke lever having its legs extended with said slits and connected to said journal means and to said locking bar for rocking said locking bar, (m) resilient means in said flanges to urge said locking bar and said yoke lever to turn away from said strap holder element into locking position, (n) a generally U-shaped locking lever, (o) second journal means in said flanges spaced from said first journal means in said flanges to support the legs of said locking lever, (p) resilient means on said second journal means to urge said second journal means and said locking lever oppositely toward said strap holder element, (q) the body of said locking lever between the outer ends of said legs forming a pair of spaced ears overlapping said yoke lever to hold said yoke lever in locking position and to block said yoke lever in unlocking position, (r) said body of said locking lever between said ears being formed into an engagement recess for manipulation of said locking lever.

References Cited
UNITED STATES PATENTS 3,183,568 5/1965 Gaylord.

FOREIGN PATENTS 390,528 10/1908 France.
831,311 8/1938 France.

BERNARD A. GELAK, *Primary Examiner.*